(12) United States Patent
Lee

(10) Patent No.: US 8,619,670 B2
(45) Date of Patent: Dec. 31, 2013

(54) METHOD OF CONTROLLING BROADCASTING IN A WIRELESS SENSOR NETWORK

(75) Inventor: Seoung Bok Lee, Yongin-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1139 days.

(21) Appl. No.: 12/252,534

(22) Filed: Oct. 16, 2008

(65) Prior Publication Data

US 2009/0097439 A1 Apr. 16, 2009

(30) Foreign Application Priority Data

Oct. 16, 2007 (KR) .......................... 10-2007-0103865

(51) Int. Cl.
*H04W 4/00* (2009.01)
*H04W 56/00* (2009.01)

(52) U.S. Cl.
USPC .......................................................... 370/328

(58) Field of Classification Search
USPC ................................................. 370/328, 350
See application file for complete search history.

(56) References Cited

U.S. PATENT DOCUMENTS

| | | | |
|---|---|---|---|
| 6,128,318 A * | 10/2000 | Sato ............................. | 370/503 |
| 7,409,022 B2 | 8/2008 | Dai et al. | |
| 7,701,884 B2 * | 4/2010 | Chapweske et al. .......... | 370/260 |
| 7,817,616 B2 | 10/2010 | Park et al. | |
| 8,050,254 B2 * | 11/2011 | Anandakumar et al. ...... | 370/352 |
| 2002/0098839 A1 * | 7/2002 | Ogino et al. ................... | 455/424 |
| 2005/0232151 A1 * | 10/2005 | Chapweske et al. .......... | 370/231 |
| 2006/0031914 A1 * | 2/2006 | Dakss et al. ................... | 725/135 |
| 2006/0045023 A1 * | 3/2006 | Kim et al. ...................... | 370/252 |
| 2006/0083265 A1 * | 4/2006 | Jordan et al. .................. | 370/503 |
| 2007/0025481 A1 * | 2/2007 | Ryu et al. ...................... | 375/354 |
| 2007/0042706 A1 * | 2/2007 | Ledeczi et al. ............... | 455/3.01 |
| 2007/0066231 A1 * | 3/2007 | Duffett-Smith et al. ..... | 455/67.11 |
| 2007/0118037 A1 * | 5/2007 | Sawanoi et al. ............... | 600/485 |
| 2007/0153789 A1 * | 7/2007 | Barker et al. ................. | 370/390 |
| 2007/0177574 A1 * | 8/2007 | Park et al. ...................... | 370/350 |
| 2008/0069071 A1 * | 3/2008 | Tang ............................. | 370/342 |
| 2008/0095247 A1 * | 4/2008 | Ohno et al. ............... | 375/240.28 |
| 2008/0320290 A1 * | 12/2008 | Moyer .......................... | 712/244 |
| 2009/0017851 A1 * | 1/2009 | Li et al. ......................... | 455/502 |
| 2009/0076700 A1 * | 3/2009 | Radpour ......................... | 701/93 |

(Continued)

FOREIGN PATENT DOCUMENTS

JP 2006-109433 A 4/2006
KR 10-0695074 B1 3/2007

*Primary Examiner* — Brandon Renner
*Assistant Examiner* — Faisal Choudhury
(74) *Attorney, Agent, or Firm* — Cha & Reiter, LLC

(57) ABSTRACT

The present invention relates to a method of controlling broadcasting in a wireless sensor network. The method includes performing broadcasting from an upper node to a lower node for a predetermined number of times, transmitting a time offset calculated according to the broadcasting from the lower node to the upper node, calculating an average of the time offsets received from at least one lower node, by the upper node and resetting the number of times of broadcasting according to the calculated average by the upper node. Accordingly, the number of times of broadcasting may be controlled according to the average of received time offsets in the wireless sensor network. In another aspect, an adjustment to the number of times of broadcasting may be received and the number of times of broadcasting may be adjusted based on an average of the received adjustments.

14 Claims, 4 Drawing Sheets

(56) References Cited

U.S. PATENT DOCUMENTS

| | | | |
|---|---|---|---|
| 2009/0247211 A1* | 10/2009 | Kuroda | 455/522 |
| 2009/0252028 A1* | 10/2009 | Hwang et al. | 370/210 |
| 2009/0290557 A1* | 11/2009 | Muller | 370/331 |

* cited by examiner

METHOD OF CONTROLLING BROADCASTING IN A WIRELESS SENSOR NETWORK

CLAIM OF PRIORITY

This application claims the benefit of the earlier filing date, pursuant to 35 USC 119) to that patent application entitled "METHOD OF CONTROLLING BROADCASTING IN WIRELESS SENSOR NETWORK" filed in the Korean Intellectual Property Office on Oct. 16, 2007 and assigned Serial No. 2007-0103865, the contents of which are incorporated herein by reference.

BACKGROUND OF THE INVENTION

1. Field of the Invention

The present invention relates to wireless broadcast sensor networks, and more particularly, to a method of controlling broadcasting between nodes configured in a wireless sensor network.

2. Description of the Related Art

WSN (Wireless Sensor Network) is a network configured with a sensor node for collecting information through a sensor, and a sink node for transmitting the collected information to an external network. Unlike a conventional network, the WSN is not used for a communication purpose, but is mainly used for an automated remote information collection and is widely used for development of various applications in scientific, medical, military, and commercial fields.

Most of the wireless sensor networks are configured with hundreds of nodes, and various time synchronizing systems are used to secure a uniform time period in each node by reducing time deviations. The time synchronizing systems include TPSN (Timing-synch Protocol for Sensor Network), RBS (Reference Broadcast Synchronization), and FTSP (Flooding Time Synchronization Protocol) systems, and the FTSP system is most frequently used.

The FTSP system is a time synchronizing system in which time information is transmitted to a network at a time point of transmitting a packet by using a time stamp, and an upper node receiving the packet corrects its local time by referring to the time stamp of the received packet. The upper node then broadcasts the corrected local time to a lower node configured in a wireless sensor network.

In the FTSP system, the upper node must broadcast for a short period to improve the accuracy of time synchronization between nodes configured in a wireless sensor network. In this case, the upper node broadcasts the time information regardless of the current status of a lower node, and thereby the energy efficiency of the total wireless sensor network may be decreased. Additionally, in the case of a wireless sensor network having a large number of nodes, a conventional FTSP system may limit the number of usable nodes and may have a disadvantage that the period of a power source replacement can be shortened.

SUMMARY OF THE INVENTION

The present invention provides a method of controlling a broadcasting period.

Further, the present invention further provides a method of controlling a broadcasting period of an upper node by using a time offset.

A method of controlling broadcasting according to an exemplary embodiment of the present invention includes performing broadcasting from an upper node to a lower node for a predetermined number of times, transmitting a time offset calculated according to the broadcasting from the lower node to the upper node, calculating an average of the time offsets received from at least one lower node, by the upper node and resetting the number of times of broadcasting according to the calculated average by the upper node.

According to the present invention, the energy efficiency in a wireless sensor network may be improved by preventing unnecessary broadcasting between nodes. Additionally, the energy efficiency in the total wireless sensor network may be improved, because the "number of times of broadcasting" required for a specific area or a specific application can be controlled. Further, the structure of the wireless sensor network can be managed in various manners with an energy saving effect.

BRIEF DESCRIPTION OF THE DRAWINGS

The above features and advantages of the present invention will become more apparent from the following detailed description in conjunction with the accompanying drawings, in which.

DETAILED DESCRIPTION

Exemplary embodiments of the present invention are described in detail with reference to the accompanying drawings. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

'Broadcasting' means transmitting a standard time value to a plurality of lower nodes at a corresponding data transmission time point by using a time stamp for time synchronization in an upper node.

Figure 1:
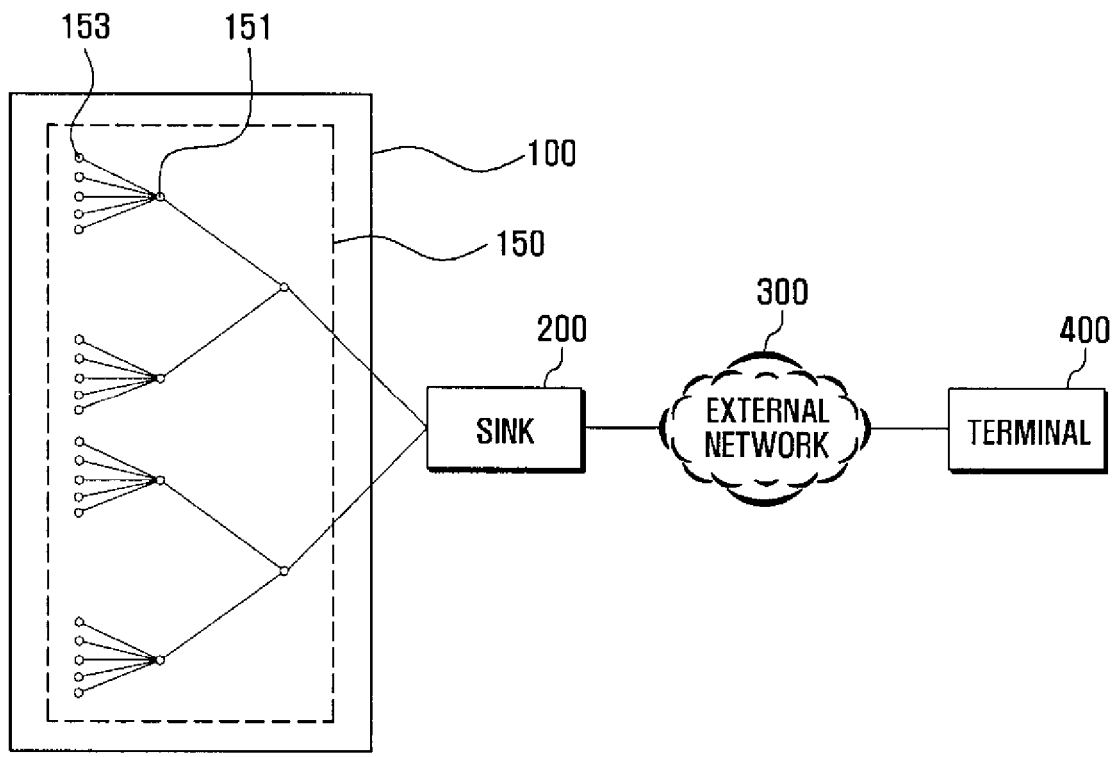
FIG. 1 is a block diagram showing a configuration of a wireless sensor network system according to the present invention.
Figure 2:
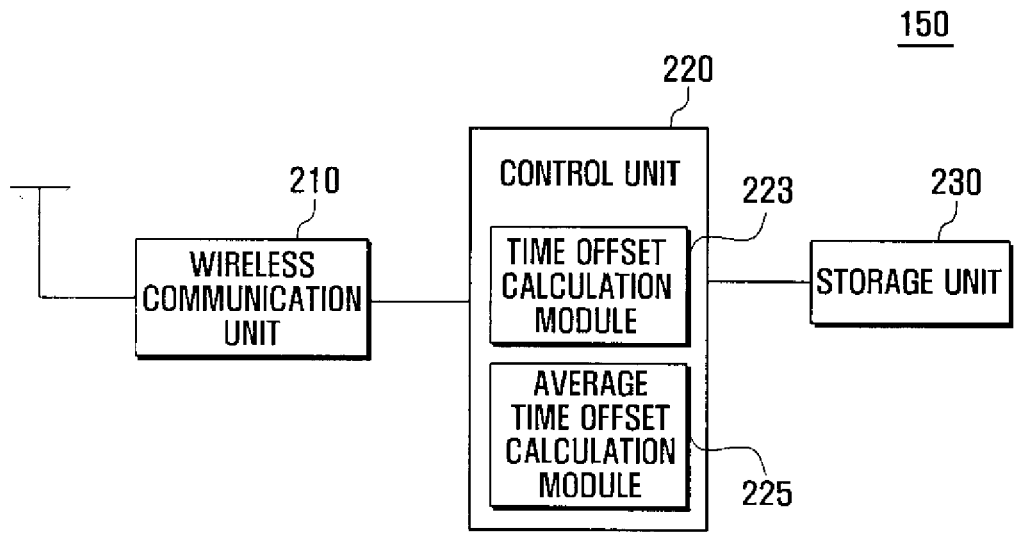
FIG. 2 is a block diagram showing a configuration of a sensor node of FIG. 1.

FIG. 1 is a block diagram showing a configuration of a wireless sensor network system according to the present invention. FIG. 2 is a block diagram showing a configuration of a sensor node of FIG. 1.

Referring to FIG. 1, the wireless sensor network system is configured with a sensor field 100, sink 200, external network 300, and terminal 400.

The sensor field 100 includes a plurality of sensor nodes 151, 153 in a sensor array 152 disposed in a tree structure. That is, the sensor nodes 151, 153 (generally referred to hereinafter as 150) are disposed in a hierarchical structure, in which each level contains a predetermined number of sensor nodes 150.

As shown in FIG. 2, each sensor node 150 includes a wireless communication unit 210 for supporting data communication, a control unit 220 for processing data, and a storage unit 230 for storing various data. In particular, the control unit 220 of the sensor node 150 includes a time offset calculation module 223 for calculating a time offset as a difference between a standard time value broadcast by an upper node 150 and a time value of a lower node 150—i.e., node 151, node 153, respectively in FIG. 1, and an average time offset calculation module 225 for calculating an average of time offsets received from the lower nodes 150. The sensor node 150 complies, for example, with the IEEE 802.15.4 standard and is used as a module for a small and low-power sensor network. The IEEE 802.15.4 standard is well-known in the art and a detailed description of this wireless standard protocol need not be discussed in detail herein.

The sink 200 connects the sensor field 100 to the external network 300, and is also referred to as a gateway or a base station.

The external network 300 may be a public network, such as the Internet, a mobile communication network or a wired/wireless network, and is used to transmit data generated by the sensor field 100 to the terminal 400.

The terminal 400 is a data processing device and may be any instrument identifying data generated by the sensor field 100, such as a mobile terminal and a computer for transmitting and receiving data.

Figure 3:
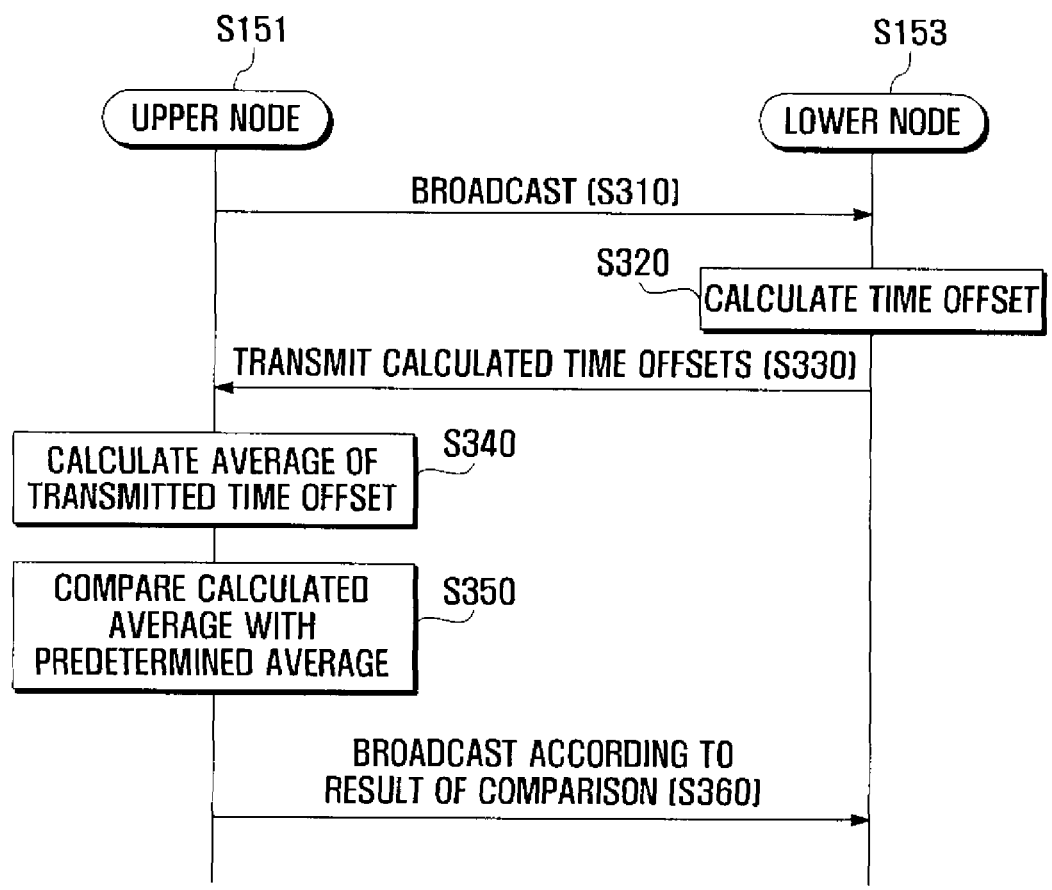
FIG. 3 is a flow chart showing a method of controlling broadcasting between nodes according to an exemplary embodiment of the present invention.

FIG. 3 is a flow chart showing a method of controlling broadcasting between nodes 151 and 153 shown in FIG. 1 according to an exemplary embodiment of the present invention.

Referring to FIG. 3, the upper node 151 sets a standard time value based on a data transmission time point when transmitting data, and broadcasts to the lower node 153 for a predetermined number of times (S310). In the lower node 153, a time offset is calculated as a difference between the standard time value received through broadcasting and the time value of the lower node 153 (S320). Subsequently, the lower node 153 transmits the calculated time offset to the upper node 151 (S330).

When the time offset is received, the upper node 151 calculates an average value of the time offsets received from at least one lower node 153 (S340). Here, the upper node 151 forms a group by connecting to a plurality of lower nodes 153 in the wireless sensor network. In the case that the broadcast is performed at the upper node 151, the time point of receiving broadcasting at each lower node 153 may be different. Accordingly, the time offset for each lower node is calculated as a difference between the standard time value and the current time of the corresponding lower node 153. Time offset is then transmitted to the upper node 151. The upper node 151 then calculates the average of the time offsets received from the plurality of lower nodes 153.

The upper node 151 compares the calculated average with a predetermined average value (S350). The predetermined average may be set at different value according to environmental factors of the wireless sensor network or according to a user setting.

The upper node 151 performs broadcasting according to the result of comparison at step S350 (S360). If the calculated average is less than the predetermined average, the upper node 151 performs broadcasting for a number of times less than a predetermined number of times. If the calculated average is greater than the predetermined average, the upper node 151 performs broadcasting for a number of times greater than the predetermined number of times.

Figure 4:
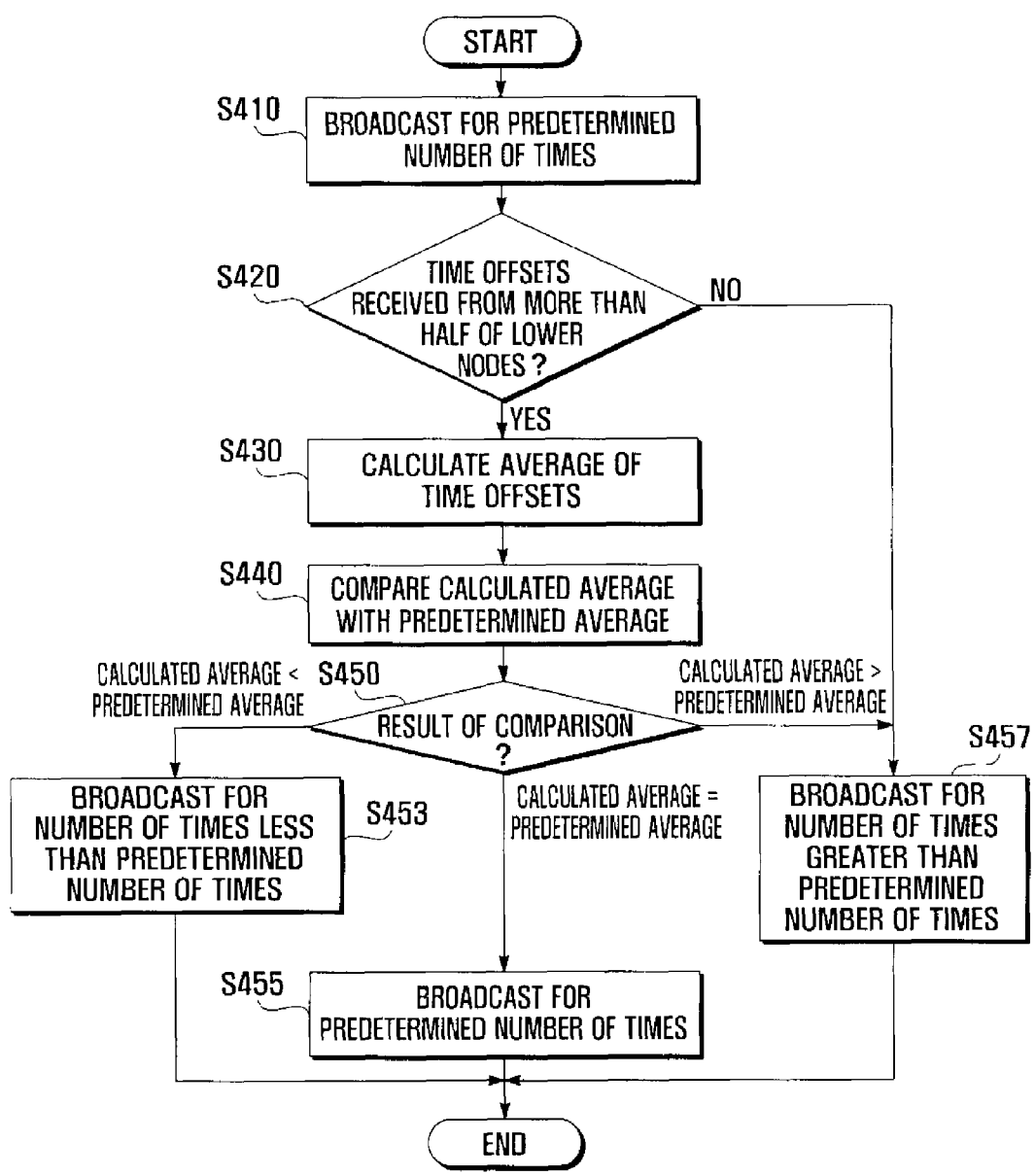
FIG. 4 is a flow chart showing a procedure of controlling broadcasting in an upper node in the method of FIG. 3.

FIG. 4 is a flow chart showing a procedure of controlling broadcasting in the upper node 151 of FIG. 3.

Referring to FIG. 4, the upper node 151 performs broadcasting for a predetermined number of times (S410). The upper node 151 determines how many lower nodes 153 are connected thereto, then determines whether time offsets are received from a select number of numbers (e.g., more than half) of the lower nodes 153 (S420). For example, if the upper node 151 communicates with 5 lower nodes 153, the number of time offsets received from the lower nodes 153 after broadcasting must be at least 3. For each lower node 153, the time offset is the difference between the time value of the lower node 153 and the standard time value received from the upper node 151.

If time offsets are not received from more than half of lower nodes 153, the upper node 151 performs broadcasting for a number of times greater than the predetermined number of times (S457). Additionally, if time offsets are not received from more than half of lower nodes 153, the upper node 151 may transmit the standard time value to the lower node 153 by unicasting, namely, by a 1:1 transmission (not shown). In the case that a large number of lower nodes 153 are included in the upper node 151, unicasting may decrease the accuracy of time synchronization or the energy efficiency. Accordingly, in the case that the number of lower nodes 153 returning a time offset value is greater than a predetermined value, broadcasting may be performed by using an average calculated from the time offsets in a group having the greatest number of nodes. Alternatively, the upper node 151 may perform broadcasting by using an average calculated from time offsets having a higher value than those received from the lower nodes 153.

If time offsets are received from more than the predetermined number of lower nodes of lower nodes 153 at step S420, the upper node 151 calculates an average of the time offsets received from the lower nodes 153 (S430). Here, the predetermined number is half the number of lower nodes 153 and the average may be calculated by calculating a sum of all received time offsets and dividing the sum by the number of lower nodes 153. For example, it is assumed that the upper node 151 includes 5 lower nodes 153 from which the time offsets are received. The upper node 151 identifies whether time offsets are received from more than half of lower nodes 153 after performing broadcasting. If time offsets are received from more than half of lower nodes 153 and the time offsets received from the lower node 153 are respectively 7 μs, 9 μs, 8 μs, 6 μs, and 7 μs, the upper node 151 calculates an average from the received time offset. In this case, the average is 7.4 μs, because the sum of the received time offsets is 37 μs and the number of lower nodes 153 is 5. In another aspect, it is assumed that the upper node 151 includes 5 lower nodes 153 and the time offsets are received from 4 of lower nodes 153 e.g. respectively 7 μs, 9 μs, 8 μs and 6 μs. The upper node 151 identifies whether time offsets are received from more than half of lower nodes 153 after performing broadcasting. The upper node 151 calculates an average from the received time offset because the time offsets are received from more than half the number of lower nodes 153. In this case, the average is 7.5 μs, because the sum of the received time offsets is 30 μs and the number of lower nodes 153 is 4.

If time offsets are not received from more than the predetermined number of lower nodes 153 at step S420, the upper node 151 performs broadcasting by adjusting the number of times of broadcasting to an increased number of times (S457).

After calculating the average of the time offsets, the upper node 151 compares the calculated average with a predetermined value (S440). The predetermined value may be set at different values according to environmental factors of the wireless sensor network. Alternatively, the predetermined value may be set by a user.

The upper node 151 performs broadcasting by resetting (adjusting) the number of broadcasts according to the result of comparison at step S440/S450. If the calculated average is less than the predetermined value, the upper node 151 resets (adjusts) the number of times of broadcasting to a decreased number of times (S453). For example, if the predetermined average value is 10 μs and the average calculated in a wireless sensor network broadcasting 8 times per period is 5 μs, the upper node 151 performs broadcasting by resetting the number of times of broadcasting to a decreased value (for example, 4 times per period).

If the calculated average is similar to or the same as the predetermined average value, the upper node 151 performs broadcasting for a predetermined number of times (S455). If the calculated average is greater than the predetermined average, the upper node 151 performs broadcasting by resetting (adjusting) the number of times of broadcasting to an increased number of times (S457). For example, if the predetermined average is 10 μs and the average calculated in a wireless sensor network performing broadcasting 8 times per period is 12 us, the upper node 151 performs broadcasting by resetting the predetermined number of times of broadcasting (8 times per period) to an increased number of times (for example, 10 times per period).

In the process of comparing the calculated average with the predetermined average value and increasing or decreasing the number of times of broadcasting according to the result of comparison, the increment or decrement of the number of times may be gradually adjusted according to the comparison result between the calculated average and the predetermined average.

While performing broadcasting, the upper node 151 may control the number of times of broadcasting according to the time offset. Because the time offset is a difference between a standard time value of the upper node 151 and a time value of a lower node 153, a lower average of time offsets offers better time synchronization when the upper node 151 broadcasts to the lower nodes 153. Accordingly, unnecessary broadcasting may be prevented by decreasing the number of times of broadcasting at the upper node 151.

Figure 5:
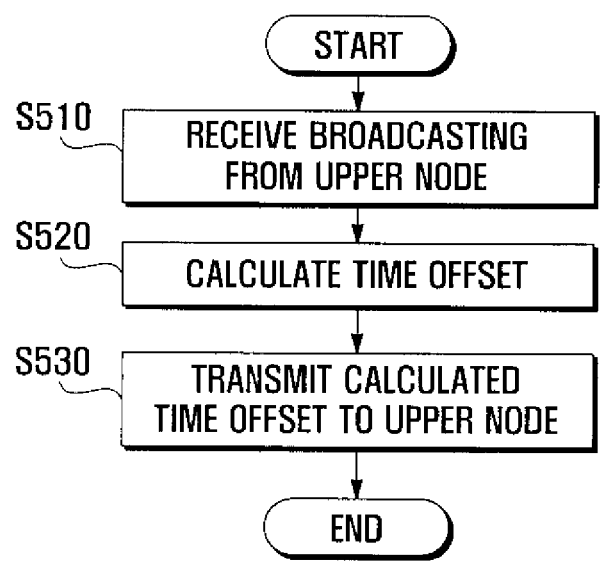
FIG. 5 is a flow chart showing a procedure of calculating a time offset in a lower node in the method of FIG. 3.

FIG. 5 is a flow chart showing a procedure of calculating a time offset in the lower node 153 of FIG. 3.

Referring to FIG. 5, the lower node 153 receives broadcasting from the upper node 151 (S510). The lower node 153 identifies a standard time value included in the broadcast, and calculates a time offset using the difference between the identified standard time value and the time value of the lower node 153 (S520). The lower node 153 then transmits the calculated time offset to the upper node 151 (S530).

In performing broadcasting according to the result of comparison between the average of time offsets and the predetermined average, the average of time offsets may be calculated according to the number of times of broadcasting. Additionally, time synchronization between sensor nodes 150 in the wireless sensor network starts at a starting point of sensing, and the time synchronization may be performed periodically by identifying the time offset between the sensor nodes 150.

Hereinabove, a method of controlling broadcasting by using an average of time offsets transmitted from lower nodes 153 is described. That is, a method of controlling broadcasting by calculating a time offset of broadcasting at a lower node 153 and transmitting the calculated time offset to an upper node 151 has been described. However the present invention is not limited thereto, and other methods of controlling broadcasting may be applied. For example, the lower node 153 may transmit an increment or decrement of the number of times of broadcasting to the upper node 151 by using the time offset. That is, the lower node 153 may calculate a time offset, determine an increment or decrement of the number of times of broadcasting according to the calculated time offset, and transmit the increment or decrement to the upper node 151. The upper node 151 then may calculate an average of the increments and decrements of the number of times of broadcasting that have been received from the lower nodes 153, and may thereby reset the number of times of broadcasting for each lower node 153.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be understood that many variations and modifications of the basic inventive concept herein described, which may appear to those skilled in the art, will still fall within the spirit and scope of the present invention as defined in the appended claims. For example, although the invention is describe with regard to receiving information from at least one-half the number of lower nodes, it would be within the knowledge of those skilled in the art to adjust this value to a select number of lower nodes providing the required information without having to perform undue experimentation.

What is claimed is:

1. A method of controlling broadcasting for time synchronization in a wireless network, comprising:
   broadcasting a standard time value from an upper node to a plurality of lower nodes for a predetermined number of times per period, the standard time value being used by the plurality of lower nodes for time synchronization in the network;
   transmitting a time offset calculated according to the broadcast standard time value from at least some of the plurality of lower nodes to the upper node;
   calculating an average of the time offsets received from the at least some lower nodes, by the upper node; and
   resetting the number of times of broadcasting per period according to the calculated average by the upper node, by:
   comparing the calculated average with a predetermined average value;
   if the calculated average is less than the predetermined average value, decreasing the number of times of broadcasting per period, and if the calculated average is greater than the predetermined average value, the upper node resets the number of times of broadcasting to be performed to an increased number of times per period.

2. The method of claim 1, wherein, if the calculated average is greater than the predetermined average value, the upper node performs unicasting with each of the lower nodes.

3. The method of claim 1, wherein calculating the average further comprises: calculating said average when at least predetermined number of the lower nodes have returned a time offset.

4. The method of claim 2, further comprising; unicasting when less than a select number of the lower nodes have returned a time offset.

5. A method of controlling broadcasting for time synchronization in a wireless network, comprising:

broadcasting, by an upper node, a standard time value for a predetermined number of times per period to a plurality of lower nodes, the standard time value being used by the plurality of lower nodes for time synchronization in the network;

receiving a time offset from at least some of the plurality of lower nodes, each time offset representing a difference between a time value of a corresponding lower node and the broadcast standard time value;

calculating an average of the received time offsets;

comparing the calculated average with a predetermined average value; and adjusting the number of times of broadcasting per period to be performed according to the result of the comparison, wherein if the calculated average is less than the predetermined average value, the number of times of broadcasting per period is decreased, and if the calculated average is greater than the predetermined average value, the number of times of broadcasting to be performed per period is adjusted to an increased number of times.

6. The method of claim 5, further comprising unicasting with each of the lower nodes if the calculated average is greater than the predetermined average value.

7. The method of claim 5, further comprising: performing broadcasting, if no time offset is determined to have been received, for a number of times per period greater than the predetermined number of times of broadcasting per period to be performed.

8. The method of claim 5, wherein calculating the average further comprises: calculating said average when at least predetermined number of the lower nodes have returned a time offset.

9. The method of claim 8, further comprising; unicasting when less than a select number of the lower nodes have returned a time offset.

10. A method of controlling broadcasting for time synchronization in a wireless network, comprising:
  broadcasting, from an upper node, a standard time value for a predetermined number of times per period to a plurality of lower nodes, the standard time value being used by the plurality of lower nodes for time synchronization in the network;
  receiving an adjustment to said predetermined number of times of broadcasting per period from at least some of said plurality of lower nodes, the adjustment being a decrease or an increase in the number of times of broadcasting per period according to a difference between a received time value and a local time that is less than, or greater than, a predetermined number of times of broadcasting per period, respectively;
  calculating an average of the received adjustment of said predetermined number of times; and
  adjusting the number of times of broadcasting per period to be performed according to the calculated average.

11. The method of claim 10 further comprising: performing unicasting when said received adjustments are received from less than a select number of the number of said plurality of lower nodes.

12. A device for controlling broadcasting for time synchronization in a wireless network, comprising:
  a processor in communication with a memory, the memory containing code which when accessed by said processor instructs said processor to:
  broadcast, by an upper node, a standard time value to a plurality of lower nodes for a predetermined number of times per period, the standard time value being used by the plurality of lower nodes for time synchronization in the network;
  receive a time offset from at least some of the plurality of lower nodes, each time offset representing a difference between a time value of a corresponding lower node and the broadcast standard time value;
  calculate an average of the received time offsets; and
  reset the number of times of broadcasting according to the calculated average, by comparing the calculated average with a predetermined average value, and if the calculated average is less than the predetermined average value, decreasing the number of times of broadcasting per period, and if the calculated average is greater than the predetermined average value, increasing the number of times of broadcasting per period.

13. The device of claim 12, further comprising;
  calculating said average when said time offsets have been received from at least a select number of the plurality of lower nodes.

14. A method of controlling broadcasting for time synchronization in a wireless network, comprising:
  broadcasting, by a first node, a standard time value for a predetermined number of times per period to a plurality of second nodes, the standard time value being used by the plurality of second nodes for time synchronization in the network;
  receiving a time offset from at least some of the plurality of second nodes, each time offset representing a difference between a time value of a corresponding second node and the broadcast standard time value;
  calculating an average of the received time offsets;
  comparing the calculated average with a predetermined average value; and
  adjusting the number of times of broadcasting per period to be performed according to the result of the comparison, by comparing the calculated average with a predetermined average value, and if the calculated average is less than the predetermined average value, decreasing the number of times of broadcasting per period, and if the calculated average is greater than the predetermined average value, the number of times of broadcasting per period is increased or unicasting to the plurality of second nodes is performed.

* * * * *

UNITED STATES PATENT AND TRADEMARK OFFICE
CERTIFICATE OF CORRECTION

| | | |
|---|---|---|
| PATENT NO. | : 8,619,670 B2 | Page 1 of 1 |
| APPLICATION NO. | : 12/252534 | |
| DATED | : December 31, 2013 | |
| INVENTOR(S) | : Seoung Bok Lee | |

It is certified that error appears in the above-identified patent and that said Letters Patent is hereby corrected as shown below:

In the Claims

Column 6, Claim 4, Line 63 should read as follows:
--...The method of claim 3...--

Signed and Sealed this
Eleventh Day of March, 2014

Michelle K. Lee
*Deputy Director of the United States Patent and Trademark Office*